(12) United States Patent
Jacksen et al.

(10) Patent No.: US 7,021,522 B2
(45) Date of Patent: Apr. 4, 2006

(54) BONDING METHODS FOR MICROCHANNEL PLATES

(75) Inventors: Niels F. Jacksen, Cave Creek, AZ (US); Michael J. Iosue, Phoenix, AZ (US); Miguel M. Saldana, Tempe, AZ (US); Jay Scott Tucker, Chandler, AZ (US)

(73) Assignee: Litton Systems, Inc., Los Angeles, CA (US)

( * ) Notice: Subject to any disclaimer, the term of this patent is extended or adjusted under 35 U.S.C. 154(b) by 0 days.

(21) Appl. No.: 10/905,847

(22) Filed: Jan. 24, 2005

(65) Prior Publication Data

US 2005/0098614 A1    May 12, 2005

Related U.S. Application Data

(62) Division of application No. 10/708,890, filed on Mar. 3, 2004, now Pat. No. 6,874,674.

(60) Provisional application No. 60/320,069, filed on Mar. 31, 2003.

(51) Int. Cl.
*B23K 20/00* (2006.01)

(52) U.S. Cl. .................................................... 228/193
(58) Field of Classification Search ................ 228/193, 228/194, 195, 121, 122.1, 182, 221, 208; 348/217.1, 777; 313/124

See application file for complete search history.

(56) References Cited

U.S. PATENT DOCUMENTS

| 5,083,697 | A | * | 1/1992 | Difrancesco | 228/116 |
| 5,514,928 | A | * | 5/1996 | Niewold | 313/105 CM |
| 5,573,173 | A | * | 11/1996 | van der Wilk et al. | 228/194 |
| 6,089,444 | A | * | 7/2000 | Slattery et al. | 228/194 |
| 6,250,541 | B1 | * | 6/2001 | Shangguan et al. | 228/208 |
| 6,521,350 | B1 | * | 2/2003 | Fey et al. | 428/472 |
| 6,874,674 | B1 | * | 4/2005 | Jacksen et al. | 228/193 |
| 6,938,817 | B1 | * | 9/2005 | Saldana et al. | 228/194 |

* cited by examiner

Primary Examiner—Kevin Kerns
Assistant Examiner—Michael Aboagye
(74) Attorney, Agent, or Firm—Marsteller & Associates, P.C.

(57) ABSTRACT

Mating faces of a microchannel plate (MCP) (50) and a multi-layer ceramic body (80) unit are deposited with a thin film having protuberances (84) using a suitable metal selected for optimum diffusion at a desired temperatures and pressure. The metallized MCP (50) and multi-layer ceramic body (80) unit are then aligned and placed in a bonding fixture (F) that provides the necessary force applied to the components to initiate a diffusion bond at a desired elevated temperature. The bonding fixture (F) is then placed in a vacuum heat chamber (V) to accelerate the diffusion bonding process between the MCP (50) and the multi-layer ceramic body unit (80).

2 Claims, 3 Drawing Sheets

BONDING METHODS FOR MICROCHANNEL PLATES

CROSS REFERENCE TO RELATED APPLICATIONS

This application is a Divisional of application Ser. No. 10/708,890, filed on Mar. 30, 2004 now U.S. Pat. No. 6,874,674, which application claimed the benefit of U.S. Provisional Application Ser. No. 60/320,069, filed Mar. 31, 2003, entitled BONDING METHOD FOR MICROCHANNEL PLATES.

BACKGROUND OF THE INVENTION

1. Technical Field

The invention relates to the field of electronic devices having microchannel plates ("MCPs"), and more particularly to methods of bonding a microchannel plate ("MCP") to other components.

2. Background Art

The present invention describes methods of bonding electro-optical components to a feed-through. The methods described herein may include bonding of other electrical, optical and mechanical components where:
(1) mechanical hold downs or retainers are not desired;
(2) morphology of the two bonding materials is not adequate for a direct surface to surface bond;
(3) bonding involves brittle materials with low shear strength;
(4) a bonding process that does not require solders or braise joints;
(5) a bonding process that does not require melting of the bonding material;
(6) mechanical and electrical bonds are desired on the same interface;
(7) the bonding must provide both electrical and mechanical interconnects; or,
(8) creation of the bond does not permanently alter the components being bonded.

Prior Methods

Method 1: Kovar rings brazed to ceramics to facilitate compressing the micro-channel plate ("MCP"). This method requires contacting both sides of the micro-channel plate to facilitate both the electrical and mechanical interconnects, and this is the primary disadvantage compared to this invention. The upper ring would serve as the upper electro-mechanical inter-connect, and the lower ring would serve as the lower electro-mechanical interconnect. This method has been used for decades to manufacture image intensifier devices.

Method 2: An alternative method is described in U.S. Pat. No. 6,040,657 that uses solder or brazing materials of Indium, Indium tin Alloys, Gold-Tin alloys and Gold-Germanium alloys, etc. to flow and wet the micro-channel plate to the feed-through assembly. A primary disadvantage to Method 1 is that a large perimeter portion of the micro-channel plate is covered by a retainer ring used to hold the micro-channel plate in position. The retainer ring occupies space in the ceramic feed-through and also requires complimentary rings to hold and position the retainer; in all there are at least 4 additional rings in the feed-through required for this Method. Additionally the perimeter coverage of the micro-channel plate restricts the design of the cathode input window, because it must accommodate the added height of the retainer and complimentary supports.

Added costs are incurred by Method 1 due to the additional supports and inherent yield losses due to assembly.

A primary disadvantage to Method 2 is that the micro-channel plate must be coated with a metal electrode suitable for bonding with the alloy material. Patterning the electrode to provide electrical and mechanical interconnects to the micro-channel plate becomes very difficult because the flow of the molten alloy material is uncontrolled. The uncontrolled flow of the alloy may allow contact with the micro-channels, which is undesirable for proper operation. The primary advantage of the current invention is that there is no flow of material.

Method 2 eliminates only 1 of the support rings so there are still 3 additional pieces required over the present invention.

U.S. Pat. Nos. 5,514,928 and 5,632,436 disclose "inter-bonding" two or more micro-channel plates using an alloy similar to those described in Method 2 above. These patents do not discuss bonding of a micro-channel plate to a ceramic feed-through.

U.S. Pat. No. 6,040,657 teaches a "solder pin" to conductively contact the micro-channel plate as described in Method 2 above.

U.S. Pat. No. 5,994,824 discloses a "metallized snap ring" similar to that used in Method 1 above.

U.S. Pat. No. 5,573,173 teaches "diffusion bonding," but describes use with an electron gun and a cathode ray tube.

While the above cited references introduce and disclose a number of noteworthy advances and technological improvements within the art, none completely fulfills the specific objectives achieved by this invention.

SUMMARY OF INVENTION

In accordance with the present invention, mating faces of a microchannel plate (MCP) and a multi-layer ceramic body unit are deposited with a thin film using a suitable metal selected for optimum diffusion at elevated temperatures and pressure. The metallized MCP and multi-layer ceramic body unit are then aligned and placed in a bonding fixture that provides the necessary force applied to the components to initiate a diffusion bond at an elevated temperature. The bonding fixture is then placed in a vacuum heat chamber to accelerate the diffusion bonding process between the MCP and the multi-layer ceramic body unit.

The present invention allows diffusion bonding of dissimilar materials, such as a micro-channel plate and ceramic feed-through, where one or both of the parts to be bonded have an irregular surface topography.

Also, ball bonds provide a point contact that reduces the force and heat required to initiate the diffusion bond. Diffusion bonding of parts with relatively large flat contact surfaces would require considerably more force. Such additional force would often negate the use of diffusion bonding because of the material properties.

An object of the present invention is to form an electro-mechanical interconnect between a fragile flat object and a rigid non-flat object, such as a micro-channel plate and a ceramic feed-through. Where the difference between flat and non-flat may be less than 0.001" slope over a one inch diameter.

These and other objects, advantages and features of this invention will be apparent from the following description taken with reference to the accompanying drawings, wherein is shown the preferred embodiments of the invention.

BRIEF DESCRIPTION OF DRAWINGS

A more particular description of the invention briefly summarized above is available from the exemplary embodiments illustrated in the drawings and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

DETAILED DESCRIPTION

So that the manner in which the above recited features, advantages, and objects of the present invention are attained can be understood in detail, more particular description of the invention, briefly summarized above, may be had by reference to the embodiment thereof that is illustrated in the appended drawings. In all the drawings, identical numbers represent the same elements.

This application is related to pending application Ser. No. 60/320,067, filed Mar. 30, 3002, now non-provisional application Ser. No. 10/708,889, filed Mar. 30, 2004, and whose disclosure is incorporated by reference herein as if fully set forth.

Figure 4:
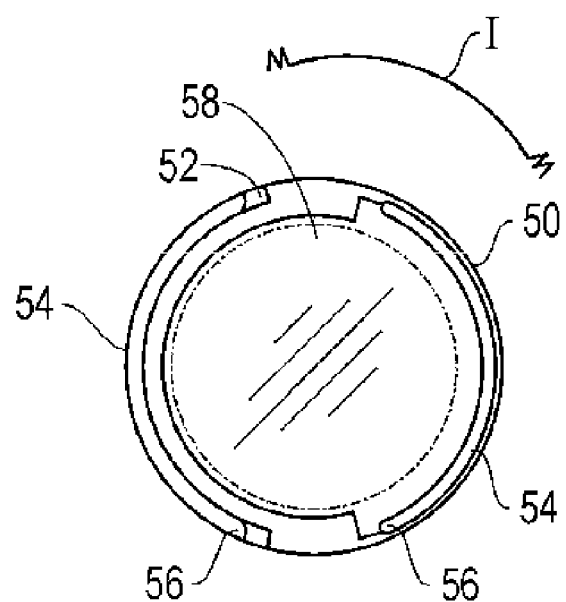
FIG. 4 is a top view of an MCP prepared for bonding.

The present method of bonding can be used to bond micro-channel plates 50 of the type used in electronic devices for electron amplification to ceramic feed-through assemblies 80 forming a MCP assembly suitable for use in electronic devices, such as image intensifier tubes 1 (shown schematically in FIG. 4) and the like. Both the feed-through 80 and the microchannel plate 50 are selectively deposited with a suitable metal or metal composite. Electroplating, screen printing, and thin film deposition techniques may be used to metallize the components. The metals are selected for optimum diffusion at the required process parameters, namely temperature and pressure. gold (Au) and copper (Cu) are preferred, but all of the low oxidation malleable metals such as silver, nickel, palladium and platinum may be used in the present process, as appropriate to the situation.

To form the bond the compatible exterior mating faces 82 and 52 of the two components 80 and 50 are positioned in close contact with each other and subjected to an empirically determined time, temperature and pressure bond cycle.

If there is no natural smooth surface between the components being bonded, an intermediate metal, such as those described above, can be positioned to fill in gaps or variations in surface flatness, particularly in the mating surface 82 of the ceramic element 80. Note that assembly of fragile microelectronics can be significantly altered with surface variations of less than 0.001" over a one inch diameter. The intermediate metal protuberance or protuberances 84 may have the form of a wire, a foil, individual bumps, or other shapes.

The metallized coatings applied to the micro-channel plate 50 and feed-through 80 are aligned with the intermediate metal layer 84 and processed through a similar time, temperature and pressure cycle to initiate the bond. Bonds generated by metallized surface to surface contact or by contact to an intermediate layer 84 are both diffusion bonds that do not require melting of the constituents.

Where the mechanical interconnect is desired on only one side of each object, but the electrical interconnect must be applied to both sides of one of the planar objects. Where the interconnect must not change under thermo-mechanical stresses of at least 400 degrees C. and 500 g's of shock.

Figure 3:
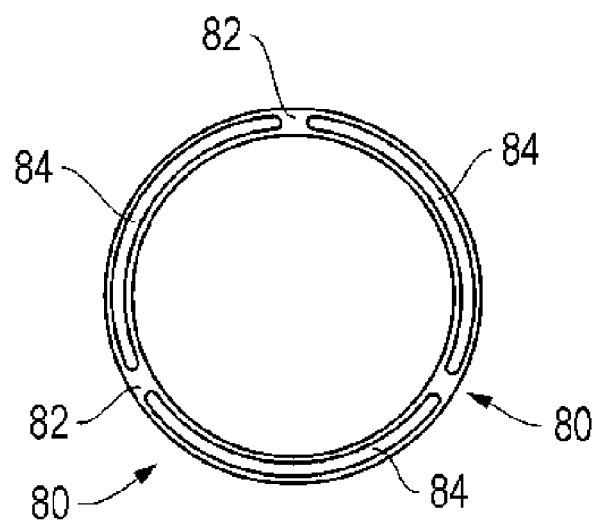
FIG. 3 is a bottom view of a multi-layer ceramic unit to which an MCP is bonded.

In FIG. 3 a multi-layer ceramic ("MLC") body member 80 is depicted as being formed having a selected metal, such as gold, bump or protuberance 84 bonded to a lower mating face or surface 82. This is a standard solid state process.

One or more standard electrical contacts, not shown, may be associated with and in electrical connection with the bumps or arcs 84. Thus, the designer may select the protuberances 84 to be a single metallic circle, or one or more separated metallic arcs depending on the type of electrical connections desired.

A MCP 50 is shown in FIG. 3 with a mating side or face 52 being metallized with a thin-film metal coating 54. The mating face 52 is adapted to mate with the lower face 82 of the MLC body 80. Optionally, both opposing faces of the MCP 50 could have similar metal coatings applied.

Generally, the MCP 50, and MLC body unit 80 are assembled as outlined below and placed in a vacuum oven V where the temperature is then elevated to a desired temperature. The components preferably remain in the vacuum oven V for a predetermined period of time before the oven temperature is slowly returned to room temperature for removal of the one or more fixtures F.

Figure 1:
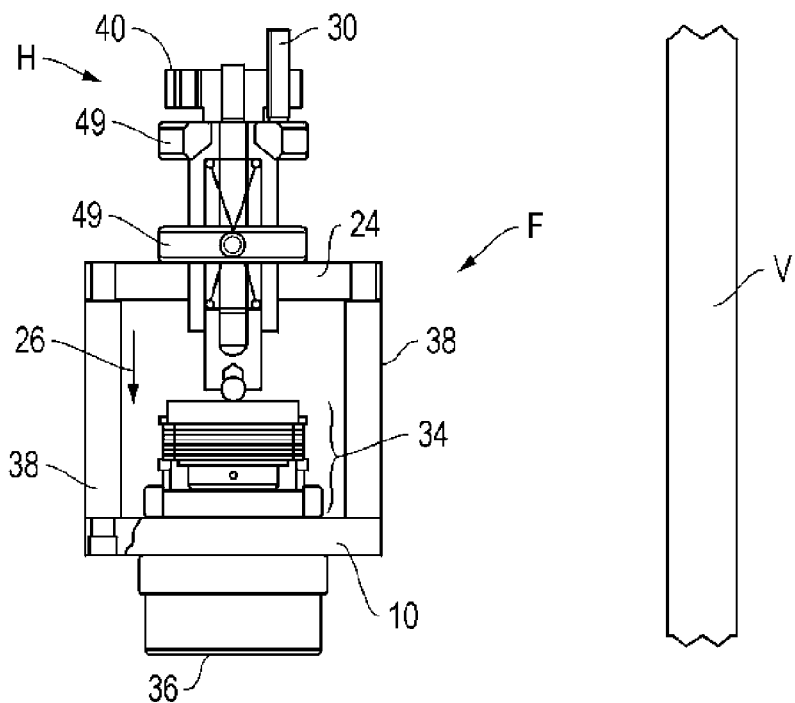
FIG. 1 is a frontal view of an assembly fixture for the present invention.
Figures 1A, 1B:
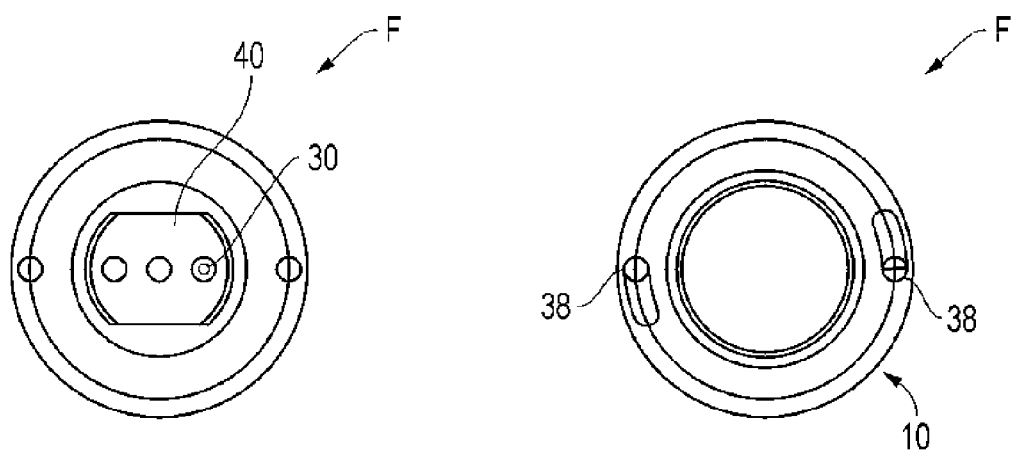
FIG. 1a is a top view of the fixture of FIG. 1.
FIG. 1b is a bottom view of the fixture of FIG. 1.
Figure 2:
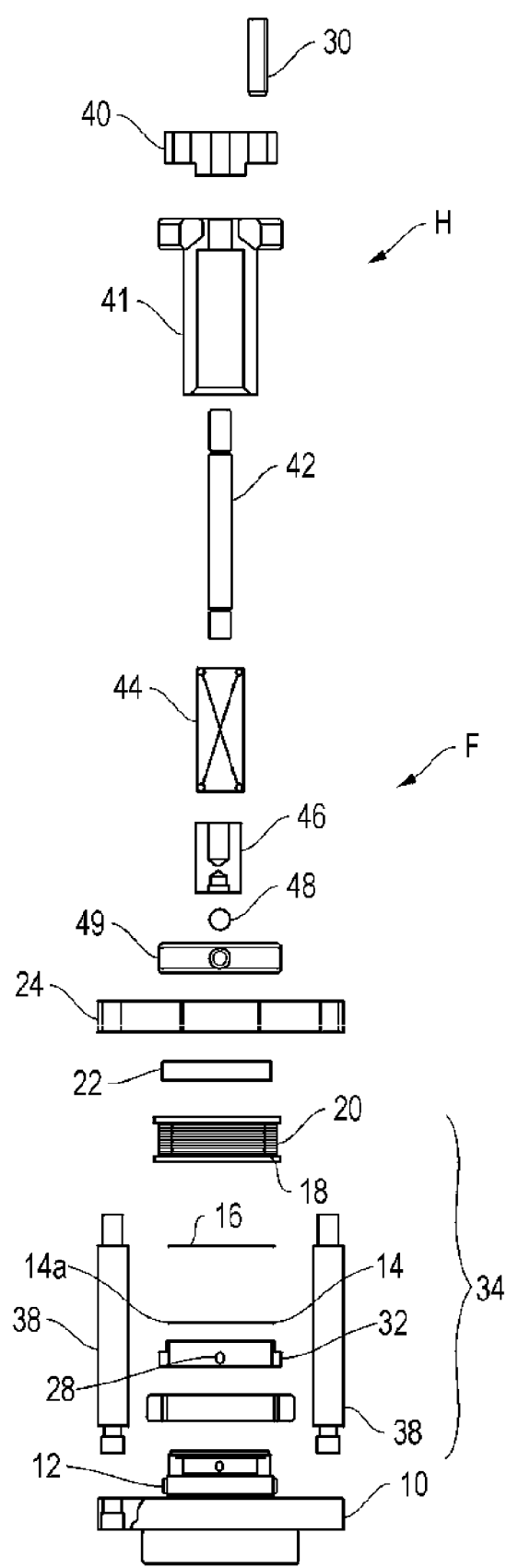
FIG. 2 is an exploded view of the assembly fixture of FIG. 1.

Referring particularly to FIGS. 1 and 2, the assembly sequence may include:

(1) the compression bond fixturing base 10 and the compression bond fixturing ring/base unit 12 are assembled;

(2) a MLC body 20 is placed on top of an compression bond fixturing ring/base unit 12 with the gold metallized surface 14a facing up;

(3) an MLC body 20 having a gold or other selected metal bump 18 bonded is placed on top of the MCP 16 using bias marks on both the MCP 16 and MLC body 20 for alignment;

(4) an upper compression bond disk unit 22 is placed on top of the MLC body 20;

(5) an upper or top plate unit 24 of the compression bond fixture 36 is assembled with the lower half portion or base 10 of the fixture without contact or force being made at this point;

(6) a desired slight force 26 is then applied to the top plate fixturing 22;

(7) a lower set screw 28 is released allowing an alignment ring unit 32 to drop and no longer make contact with the MLC body 20 (this step may not be necessary during removal of components); and (8) a pre-selected force is applied to the compression unit 34 using an upper set screw 30 of the compression bond fixture 36.

Disassembly is done in the reverse order slowly using the set screw 30 to release the pressure before continuing.

Generally, one or more rigid posts 38 maintain the separation of the lower base 10 and the upper plate unit 24. A handle assembly H for setting and releasing the bonding pressure may include a handle or knob 40 with the upper set screw 30 operably connected to a handle cylinder 41, a shaft 42, spring 44, and a piston or cup unit 46 that restrains a ball bearing 48. A locking nut 49 may optionally cooperate with the handle assembly H to lock the fixture 36 at a desired compression force level.

Advantages of the Present Invention:
(1) Provides a bonding surface that allows the flat electrical component to be bonded in a stress free state without deformation to a non-flat ceramic feed-through. The intermediate bonding material deforms rather than the microchannel plate.
(2) Provides a small footprint for bonding, facilitating a diffusion bond between the micro-channel plate and the intermediate bonding material.
(3) A heat cycle around 400 C is used to enhance the diffusion bond rather than degrade the bond as in the solder flow systems. Bonds robust to the described heat cycle are desirable because of subsequent processing. Bonding for Cu—Au and Au—Au systems has been observed at room temperature.
(4) Diffusion bonds of the type described in the current invention can be reworked without loss of the feed-through assembly. Solder methods can degrade the feed-through assembly overtime because of the solvency of any metallized ceramic layer.
(5) The present invention requires the least number of assembled components of any previous image tube design. Reducing the number of components improves the precision of the assembly and the methods for manufacturing. Fewer components also allow for reducing the size of the package.
(6) The open input face of the micro-channel plate allows for improved design of the cathode input window by reducing the depth of the cavity.
(7) The present invention provides a method for bonding a micro-channel plate directly to a ceramic feed-through without the use of separate snap rings, mechanical hold downs, or solder reflow methods.
(8) The bond between the micro-channel plate and the ceramic feed-through is achieved via diffusion bonding of two compatible metals. Applicable metals include, but are not limited to: Gold, Silver, Palladium, Platinum, Nickel, and Copper.
(9) Each of the parts to be bonded is coated with one or more of the selected metals. One of the parts, preferably the feed-through, also has intermediate metal layer attached by pressing or using standard wire bonding equipment. The intermediate metal layer is malleable, and can therefore make a conforming uniform surface from a non-uniform one such as the ceramic feed-through. The use of ball bonds also has a significantly reduced surface area so that relatively small forces can provide the high pressures required for initiating the diffusion bond.
(10) The conforming nature of the bond allows for the low shear strength flat micro-channel plate to be compressed against the rigid non-flat ceramic feed-through such that a diffusion bond can occur.
(11) After deposition with the selected metals, the microchannel plate and feed-through are assembled in a constant force compression fixture, see FIG. 1, and a predetermined force 26 is applied. The force 26 can be varied depending on the geometry and material of the parts to be bonded. The compression fixture 36 is used to accelerate the diffusion bond and heat may also be applied to further enhance the bond.
(12) Once the thermo-mechanical cycle is complete the bond is secure and the parts are ready for use. No additional annealing or compression cycles are typically required.

Alternative Embodiments:
Fabrication of parts with a surface flatness suitable for diffusion bonding may be used; however, it is believed that such technique would be considerably more expensive than preferred point contact ball bonds.

Process controls required for solder reflow methods are also more expensive than the diffusion bond methods; however, these process controls are not readily adapted or suitable to vacuum processing requirements for image tubes.

The foregoing disclosure and description of the invention are illustrative and explanatory thereof, and various changes in the size, shape and materials, as well as in the details of the illustrated construction may be made without departing from the spirit of the invention.

What is claimed is:

1. A method for bonding a microchannel plate (MCP) to a multi-layer ceramic body (MLC) unit comprising the steps of:

mating surfaces of the microchannel plate (MCP) and the multi-layer ceramic body (MLC) unit are deposited with a thin film using a suitable metal selected for optimum diffusion at elevated temperatures and pressure; the film deposition of the surface of the multi-layer ceramic body is formed having protuberances placed compatible for bonding of the mating surfaces of the MCP and MLC;

a metallized MCP and MLC body unit are aligned and placed in a bonding fixture for applying a force sufficient to initiate a diffusion bond between the mating surfaces of the MCP and MLC at a selected elevated temperature; and the bonding fixture is placed in a vacuum heat chamber to accelerate the diffusion bonding process between the MCP and the multi-layer ceramic body unit.

2. The invention of claim 1 wherein the protuberance is formed from a metal selected from the group consisting of gold, silver, nickel, platinum, and palladium.

* * * * *